United States Patent
Kuo et al.

(10) Patent No.: US 11,599,726 B1
(45) Date of Patent: *Mar. 7, 2023

(54) SYSTEM AND METHOD FOR DETECTING PORTABILITY OF SENTIMENT ANALYSIS SYSTEM BASED ON CHANGES IN A SENTIMENT CONFIDENCE SCORE DISTRIBUTION

(71) Applicant: Medallia, Inc., San Francisco, CA (US)

(72) Inventors: Tzu-Ting Kuo, Mountain View, CA (US); Ji Fang, Mountain View, CA (US)

(73) Assignee: Medallia, Inc., San Francisco, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/248,078

(22) Filed: Jan. 7, 2021

Related U.S. Application Data

(63) Continuation of application No. 16/819,723, filed on Mar. 16, 2020, now Pat. No. 11,048,883, which is a continuation of application No. 15/588,503, filed on May 5, 2017, now Pat. No. 10,592,606.

(51) Int. Cl.
| | |
|---|---|
| *G06F 16/9535* | (2019.01) |
| *G06F 40/30* | (2020.01) |
| *G06N 3/12* | (2006.01) |
| *G06N 5/04* | (2006.01) |
| *G06Q 30/0282* | (2023.01) |
| *G06Q 10/067* | (2023.01) |
| *G06N 3/126* | (2023.01) |

(52) U.S. Cl.
CPC ........... *G06F 40/30* (2020.01); *G06Q 10/067* (2013.01); *G06Q 30/0282* (2013.01); *G06N 3/126* (2013.01); *G06N 5/041* (2013.01)

(58) Field of Classification Search
CPC .............................. G06F 16/9535; G06F 40/30
USPC ........................................... 707/737; 704/251
See application file for complete search history.

(56) References Cited

U.S. PATENT DOCUMENTS

| | | | |
|---|---|---|---|
| 8,423,551 B1 * | 4/2013 | Ben-Artzi ........... | G06F 16/9535 707/737 |
| 8,972,242 B2 * | 3/2015 | Hao ........................ | G06F 40/30 704/251 |
| 10,592,606 B2 * | 3/2020 | Kuo ....................... | G06F 40/30 |
| 2015/0248424 A1 * | 9/2015 | Berube ................... | G06F 16/93 715/234 |

\* cited by examiner

*Primary Examiner* — Farzad Kazeminezhad

(57) ABSTRACT

Embodiments of the present invention provide a system that that can be used to determine whether a sentiment analysis model is portable between two data sets. During operation, the system analyzes the text of a respective review in a data set (e.g., a set of reviews) using the sentiment analysis model to determine a sentiment expressed in the review. The system then computes a confidence score, which indicates the accuracy of a respective sentiment. The system subsequently determines a confidence score distribution for various sentiments, as determined by the sentiment analysis model. The system determines the significance of changes between the confidence score distribution and a benchmark confidence score distribution, which is associated with a benchmark data set for which the sentiment analysis model yields a high accuracy. The system can then determine whether the sentiment analysis model is portable to the data set based on the significance of changes.

26 Claims, 9 Drawing Sheets

SYSTEM AND METHOD FOR DETECTING PORTABILITY OF SENTIMENT ANALYSIS SYSTEM BASED ON CHANGES IN A SENTIMENT CONFIDENCE SCORE DISTRIBUTION

RELATED APPLICATIONS

This application is a continuation application and claims the benefit and priority to the U.S. patent application Ser. No. 16/819,723 filed on Mar. 16, 2020, which claims the benefit and priority to the U.S. patent application Ser. No. 15/588,503 filed on May 5, 2017 (now U.S. Pat. No. 10,592,606), all of which are incorporated herein by their entirety.

BACKGROUND

Field

This disclosure is generally related to sentiment analysis. More specifically, this disclosure is related to a method and system for determining portability of a sentiment analysis system.

Related Art

With the advancement of the computer and network technologies, various operations performed by users from different applications lead to extensive use of web services. This proliferation of the Internet and Internet-based user activity continues to create a vast amount of digital content. For example, multiple users may provide reviews (e.g., fill out surveys) about a business entity (e.g., a hotel or a restaurant) via different applications, such as mobile applications running on different platforms, as well as web-interfaces running on different browsers in different operating systems. Furthermore, users may also use different social media outlets to post their reviews about the business entity.

An application server for the business entity may store the reviews in a local storage device. Machine learning techniques can be used on the reviews to obtain the sentiment from the reviews. Sentiment analysis involves determining whether the text of a review expresses positive, negative, neutral, or mixed sentiments. Such sentiment analysis typically uses a historic data set for training a sentiment analysis model. For example, a sentiment analysis model can be trained using a training data set that has been labeled by a user (e.g., the sentiments have been identified by the user). The trained model learns the associations between various language patterns and the corresponding sentiments in the training data set. The trained model is then used to analyze subsequent new data sets. When the trained model is used to analyze new data sets similar to the training data set, the model can achieve high accuracy.

Although a number of methods are available for sentiment analysis, some problems still remain in determining whether a sentiment analysis model is portable to another data set in the same domain or to a new domain.

SUMMARY

Embodiments of the present invention provide a system that can be used to determine whether a sentiment analysis model can be portable between two data sets. During operation, the system analyzes the text of a respective review in a data set (e.g., a set of reviews) using the sentiment analysis model to determine a sentiment expressed in the review. The system then computes a confidence score, which indicates an accuracy of a respective sentiment. The system subsequently determines a confidence score distribution for various sentiments, as determined by the sentiment analysis model. The system further determines the significance of changes between the confidence score distribution and a benchmark confidence score distribution, which is associated with a benchmark data set for which the sentiment analysis model yields a high accuracy. The system can then determine whether the sentiment analysis model is portable to the data set based on the significance of changes.

If the significance of changes is greater than or equal than a portability threshold, the system can determine that the sentiment analysis model is portable to the data set, thereby indicating that the sentiment analysis model can yield a high accuracy for the data set.

The benchmark data set can include a set of reviews over a period of time for a business entity. The data set can be one of: (i) a set of reviews over a subsequent period of time for the same business entity; (ii) a set of reviews for a another business entity in a same industry as the business entity; and (iii) a set of reviews for a another business entity in a different industry than the business entity.

The portability threshold can be a percentage of variation in accuracy that the business entity can tolerate.

On the other hand, if the significance of changes is less than the portability threshold, the system can determine that the sentiment analysis model needs retraining for the data set, and can indicate that the sentiment analysis model is not portable to the data set. In some embodiments, the system can determine whether the significance of changes is less than the portability threshold by determining a recall of a set of p-values obtained from applying a Kolmogorov-Smirnov (K-S) test to the confidence score distribution and the benchmark confidence score distribution, and comparing the recall with the portability threshold.

It should be noted that the system can use the benchmark data set to train the sentiment analysis model.

The system can also determine respective median scores for the confidence score distribution and the benchmark confidence score distribution. If the median score for the confidence score distribution is higher than the median score for the benchmark confidence score distribution, the system can set the data set as a benchmark data set for subsequent application of the sentiment analysis model.

BRIEF DESCRIPTION OF THE FIGURES

In the figures, like reference numerals refer to the same figure elements.

DETAILED DESCRIPTION

Figure 1A:
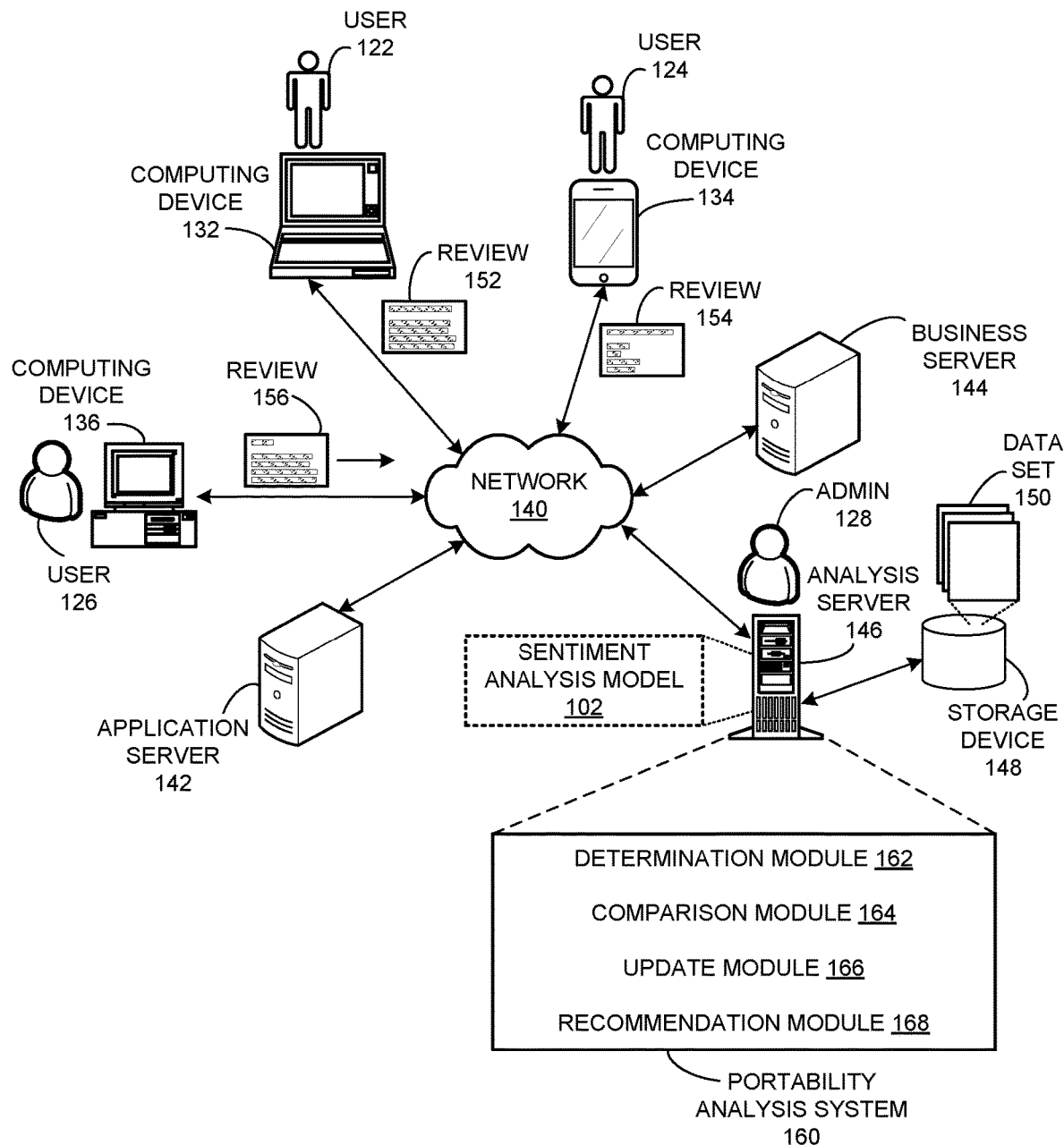
FIG. 1A illustrates an exemplary portability analysis system, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of automatically determining portability of a sentiment analysis model is solved by providing a system that automatically and proactively performs portability analysis for the sentiment analysis model. Portability of a sentiment analysis model indicates whether the sentiment analysis model that is trained for one set of user reviews can be applied to another set of user reviews.

Due to ease of access via the Internet, a large number of users can provide reviews about a business entity using one or more distributed services (e.g., TripAdvisor, Facebook, Twitter, Yelp, etc.). Such a review can include a textual description of the user's sentiments. A sentiment analysis model analyzes the text of the review to determine the sentiment expressed in the review (e.g., positive, negative, neutral, or mixed sentiment). Typically, a sentiment analysis model is trained using a training data set, for which the sentiments have already been identified. The trained model is then used to determine user sentiments in subsequent new data sets.

However, a new data set typically changes and evolves from the training data set (e.g., a new phenomenon may appear). If the new data set deviates significantly from the training data set, the accuracy of the sentiment analysis model may decrease significantly. With existing technologies, such a decrement in accuracy can be detected based on a reactive intervention. If the administrator observes that the sentiment analysis model has not accurately determined the sentiments, the administrator can manually parse the review to determine the sentiment expressed in the review and compare the result with the sentiments provided by the sentiment analysis model.

As a result, the sentiment analysis model requires the administrator to react to the decrement in accuracy and determine whether the model is portable to the subsequent data sets. In the same way, if a sentiment analysis model is trained for one business entity in one domain, the administrator may wish to deploy the model for another business entity in the same domain or a business entity in another domain. For example, a sentiment analysis model trained using hotel reviews of a hotel chain can be portable to the reviews of another hotel chain or the restaurant reviews of a restaurant chain. Determining portability for the model, thus, relies on the administrator's manual intervention. This process can be tedious and time-consuming, and may not be scalable.

To solve this problem, embodiments of the present invention provide a portability analysis system that can proactively and automatically detect portability of a sentiment analysis model, thereby ensuring the performance and quality of the determinations based on the sentiment analysis model for the new data sets. During operation, the sentiment analysis model is trained with a benchmark data set. This benchmark data set can be an initial training data set (e.g., a data set representing reviews in a first quarter time-period for a business entity).

In addition to determining the sentiment from the text of a review, the model can also calculate a confidence score for the determined sentiment. This confidence score indicates how accurate the determined sentiment is. Typically, a high confidence score indicates high accuracy. The system generates a confidence score distribution based on the confidence scores obtained from the benchmark data set. This confidence score distribution can be referred to as the benchmark confidence score distribution.

For a new data set, the sentiment analysis model determines the sentiment as well as the corresponding confidence scores. The new data set can be associated with a subsequent time period for the same business entity (e.g., a data set representing reviews in a second quarter), a different business entity in the same domain, or a business entity in a different domain (e.g., a data set representing reviews for a different industry). The system generates a new confidence score distribution for the new data set. The system then compares the benchmark and new confidence score distributions to determine the differences (or changes) between the distributions.

In some embodiments, the system can use a Kolmogorov-Smirnov test (K-S test) to detect whether the determined differences are significant. If the differences are not significant (e.g., less than a portability threshold), the system can determine that the sentiment analysis model is portable to the subsequent time period or the new business entity/domain. In this way, the portability analysis system facilitates automatic detection of portability for the sentiment analysis model without intervention from an administrator, thereby providing an automatic approach comparable to human's performance.

Portability Analysis System

FIG. 1A illustrates an exemplary portability analysis system, in accordance with an embodiment of the present invention. In this example, a large number of users 122, 124, and 126 of a business entity provide reviews 152, 154, and 156, respectively, about the business entity via a variety of computing devices 132, 134, and 136, respectively. Here, users 122, 124, and 126 can be considered as reviewers for the business entity. Examples of a review include, but are not limited to, a survey with numerical indicators, a social media post, and a review posted on a website. Such a business entity can be an entity in the hospitality business (e.g., a hotel, an event management company, a theme park, a transportation service provider, a cruise line, etc.).

These computing devices are coupled via a network 140, which can be a local or wide area network, to an application server 142 that provides a distributed service (e.g., TripAdvisor, Facebook, Twitter, Yelp, etc.). It should be noted that these reviews can be hosted on different servers associated with the corresponding service. The business entity can maintain a business server 144 coupled to network 140. Business server 144 can store the review information of the business entity provided by the distributed service. Such review information can include reviews of the business entity over a period of time (e.g., on a quarterly basis).

The business entity can run a sentiment analysis model 102 on an analysis server 146. During operation, model 102 is trained using a training data set with identified sentiments. When model 102 is trained, model 102 is used to determine user sentiments in a new data set. Suppose that a new data set 150 includes reviews 152, 154, and 156. Data set 150 can be a data set for a subsequent time period of the training data set or for a different business entity/domain than the training data set. Analysis server 146 can obtain data set 150 from business server 144 and store in a local storage device 148. Model 102 analyzes the text of reviews 152, 154, and 156 to determine the sentiment expressed in these reviews. For example, model 102 can determine how different phrases in the reviews correspond to one or more sentiments expressed in the review. Model 102 can generate a respective tag for reviews 152, 154, and 156. The tag can indicate whether the corresponding review expresses positive, negative, neutral, or mixed sentiment.

However, data set 150 can change and evolve from the training data set. If data set 150 deviates significantly from the training data set, the accuracy of model 102 may decrease significantly. With existing technologies, such a decrement in accuracy can be detected based on an administrator 128's reactive intervention. Administrator 128 can be an administrator of the business entity. If administrator 128 observes that the sentiments provided by model 102 have not accurately reflected the sentiments in data set 150, administrator 128 manually parses reviews 152, 154, and 156 to determine the sentiments expressed in data set 150 and compare the result with the sentiments provided by model 102.

As a result, model 102 requires administrator 128 to react to the decrement in accuracy and determine whether model 102 is portable to data set 150. For example, if reviews 152, 154, and 156 are restaurant reviews, and model 102 is trained using hotel reviews, administrator 128 needs to manually determine whether model 102 can be used to determine the sentiments in reviews 152, 154, and 156. Determining portability for model 102, thus, relies on administrator 128's manual intervention. This process can be tedious and time-consuming, and may not be scalable.

To solve this problem, embodiments of the present invention provide a portability analysis system 160 that proactively and automatically detects portability of sentiment analysis model 102. System 160 ensures the performance and quality of the determinations based on model 102 for data set 150. System 160 can run on analysis server 146. It should be noted that analysis server 146 and business server 144 can be co-located in the same physical device or be coupled to each other via network 140. In some embodiments, sentiment analysis model 102 is part of portability analysis system 160. For example, portability analysis system 160 can include a determination module 162, which includes sentiment analysis model 102.

During operation, model 102 is trained with a benchmark data set. This benchmark data set can be the initial training data set. In addition to determining the sentiments, model 102 can also calculate respective confidence scores for the determined sentiments. System 160 obtains the confidence scores (e.g., from one or more network packets) and stores them in a local storage device 148. System 160 generates a confidence score distribution based on the confidence scores and stores the distribution in storage device 148. This confidence score distribution can be referred to as the benchmark confidence score distribution. Model 102 also determines the corresponding confidence scores for the sentiments determined for data set 150. System 160 generates a new confidence score distribution for data set 150. A comparison module 164 of system 160 then compares the benchmark and new confidence score distributions to determine the differences (or changes) between the distributions.

In some embodiments, system 160 uses a K-S test to detect whether the determined differences are significant. If the differences are not significant (e.g., less than a portability threshold), system 160 determines that model 102 is portable to data set 150. This portability threshold can be predetermined by administrator 128 or derived from empirical data. On the other hand, if system 160 determines that model 102 is not portable to data set 150, a recommendation module 168 of system 160 proactively recommends a retraining for model 102 for data set 150 to administrator 128. In this way, system 160 facilitates automatic detection of portability for model 102 without intervention from administrator 128, thereby providing an automatic approach comparable to a human's performance.

In some embodiments, system 160 further includes an update module 166, which updates the benchmark data set. For example, if the median confidence score of data set 150 is more than the median confidence score of the benchmark data set, update module 166 sets data set 150 as the benchmark data set. Adjusting the benchmark data set based on the median confidence score ensures that system 160 maintains the distribution with the highest accuracy as the benchmark data set.

Figure 1B:
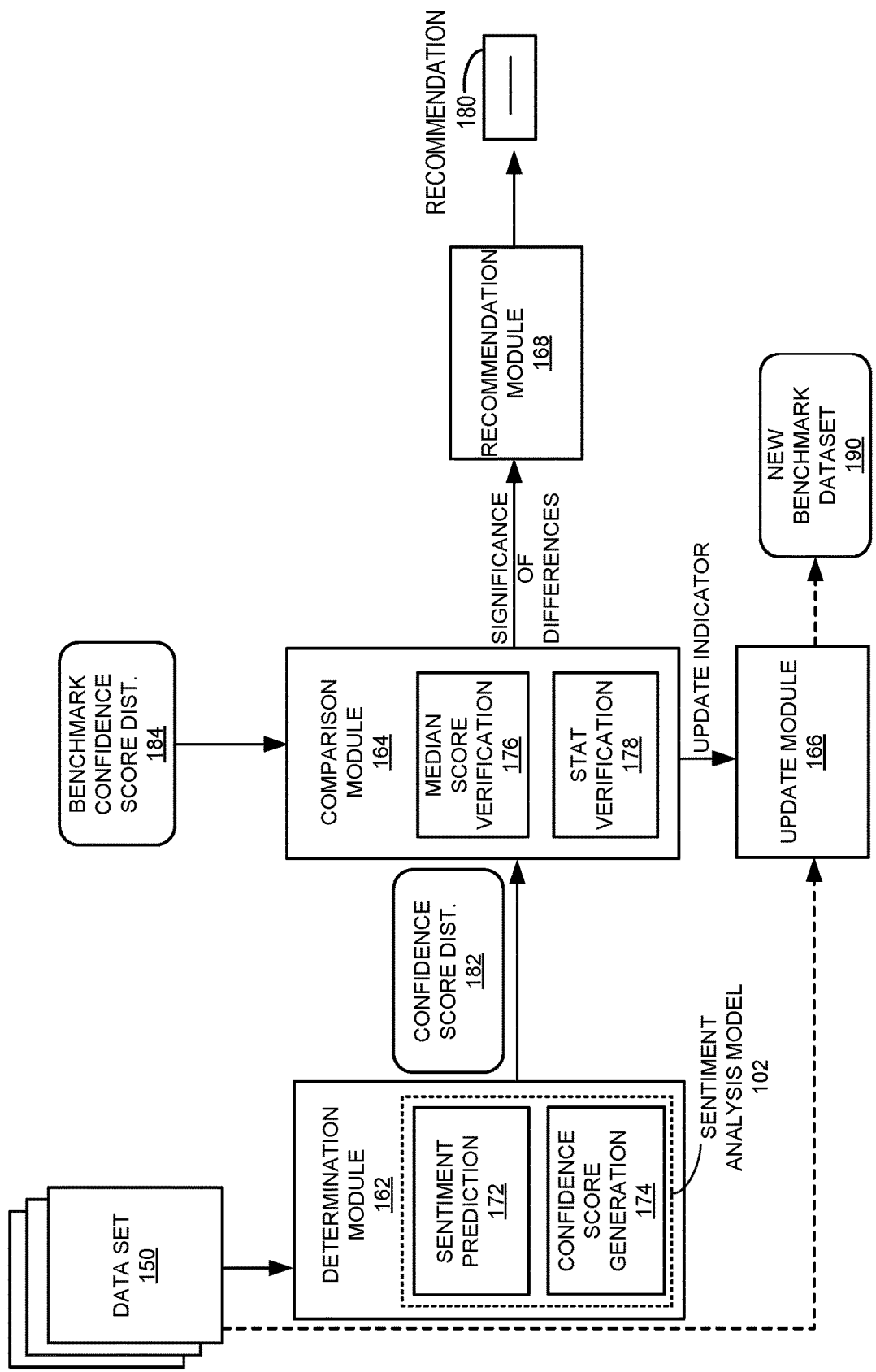
FIG. 1B illustrates exemplary components of a portability analysis system, in accordance with an embodiment of the present invention.

FIG. 1B illustrates exemplary components of a portability analysis system, in accordance with an embodiment of the present invention. In this example, sentiment analysis model 102 is incorporated with determination module 162. Model 102 can include a sentiment prediction mechanism 172, which analyzes the text of review 152 in data set 150 to determine (or predict) the sentiment expressed in review 152. Model 102 further includes a confidence score generation mechanism 174, which calculates a confidence score for the determined sentiment for review 152. In the same way, sentiment prediction mechanism 172 determines the sentiment expressed in reviews 154 and 156, and confidence score generation mechanism 174 calculates a respective confidence score for the determined sentiments for reviews 154 and 156.

Confidence score generation mechanism 174 then calculates a confidence score distribution 182 based on the calculated confidence scores and provides confidence score distribution 182 to comparison module 164. Comparison module 164 also obtains a benchmark confidence score distribution 184 (e.g., from storage device 148, as described in conjunction with FIG. 1A). Comparison module 164 includes a median score verification mechanism 176, which determines whether the median confidence score of data set 150 is more than the median confidence score of the benchmark data set. If so, comparison module 164 provides an update indicator to update module 166, which, in turn, sets data set 150 as a new benchmark data set 190.

Comparison module 164 further includes a statistics verification mechanism 178, which compares confidence score distributions 182 and 184 to determine the differences (or changes) between distributions 182 and 184. Statistics verification mechanism 178 uses a K-S test to determine the significance of the differences. Based on the significance of the differences, recommendation module 168 provides a recommendation 180 to administrator 128 indicating whether model 102 is portable to data set 150. For example, if the differences are less than a portability threshold (e.g., a 5% threshold), recommendation 180 indicates that model 102 is portable to data set 150. This threshold can be predetermined by administrator 128 or derived from empirical data. On the other hand, if system 160 determines that model 102 is not portable to data set 150, recommendation module 168 proactively indicates in recommendation 180 that a retraining for model 102 for data set 150 is needed.

Portability Analysis

Figure 2:
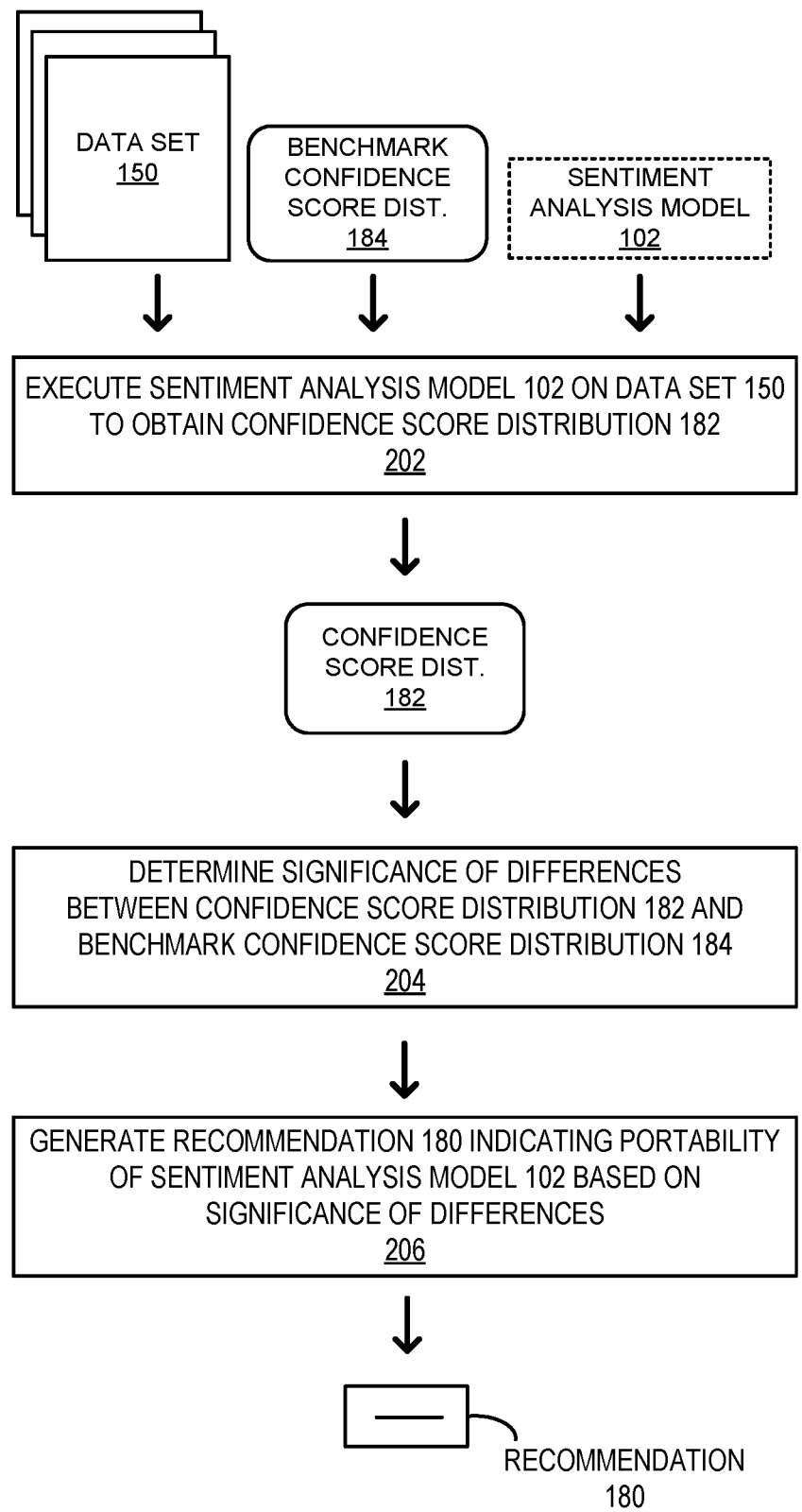
FIG. 2 presents a flowchart illustrating a method of a portability analysis system determining portability of a sentiment analysis model, in accordance with an embodiment of the present invention.

FIG. 2 presents a flowchart illustrating a method of a portability analysis system determining portability of a sentiment analysis model, in accordance with an embodiment of the present invention. During operation, the system uses data set 150 and benchmark confidence score distribution 184 to determine the portability of sentiment analysis model 102. The system executes sentiment analysis model 102 on data set 150 to obtain confidence score distribution 182 (operation 202). The system determines the significance of differences between confidence score distribution 182 and benchmark confidence score distribution 184 (operation 204). The system then generates recommendation 180 indicating portability of sentiment analysis model 102 based on the significance of differences (operation 206). The system can display a recommendation to administrator 128 indicating the portability of sentiment analysis model 102.

Figure 3:
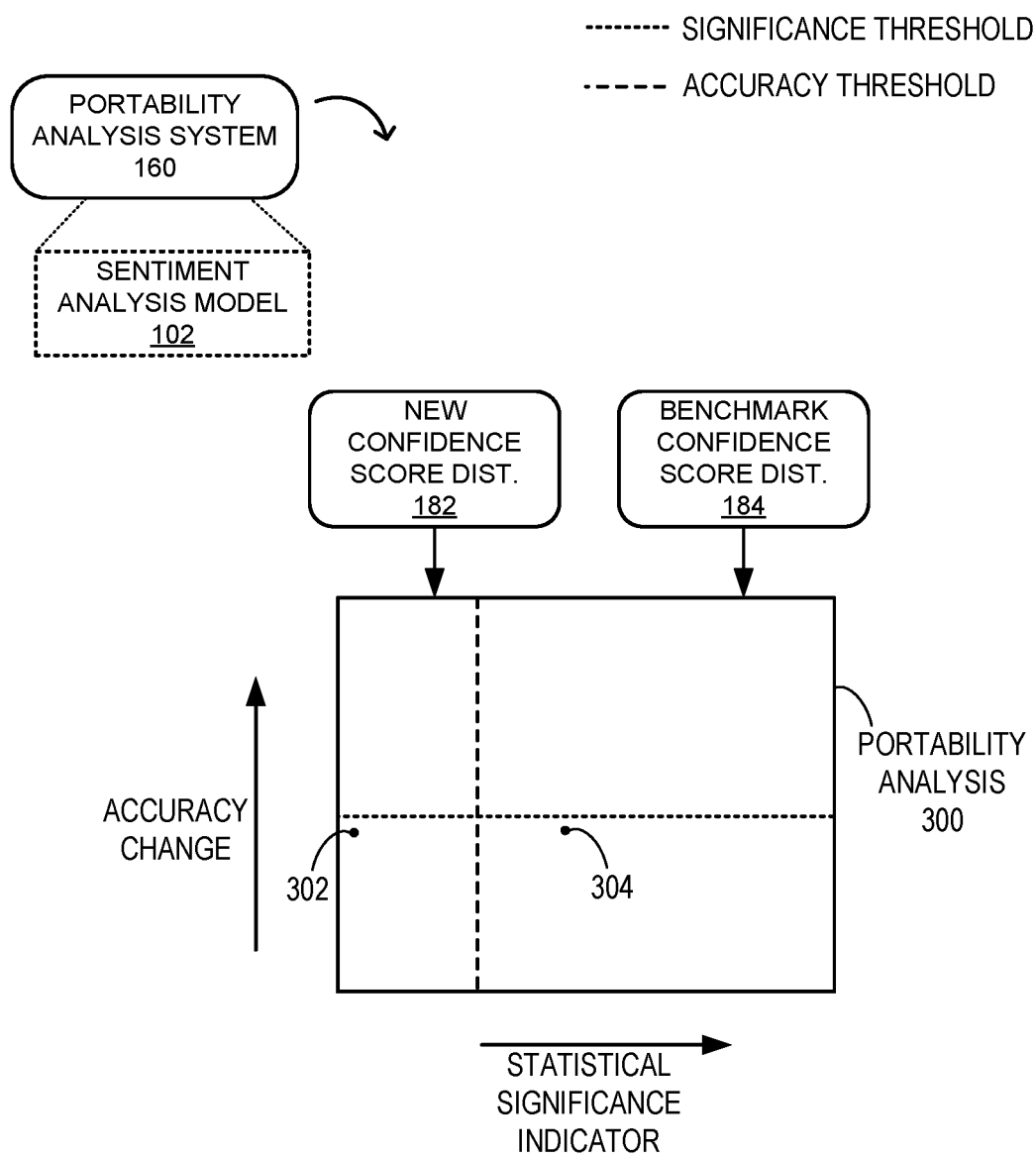
FIG. 3 illustrates an exemplary portability analysis of a sentiment analysis model, in accordance with an embodiment of the present invention.

FIG. 3 illustrates an exemplary portability analysis of a sentiment analysis model, in accordance with an embodiment of the present invention. Portability analysis system 160 maintains portability analysis 300, which represents the significance of changes (e.g., K-S test results) for a business entity's data set over time (or across business entities/domains). System 160 compares the changes between new and benchmark confidence score distributions 182 and 184, respectively, with a statistical significance indicator. In some embodiments, the statistical significance indicator is the p-value from the K-S test. System 160 determines an accuracy threshold such that differences below the accuracy threshold yield a recommendation indicating that sentiment analysis model 102 is not portable. System 160 can determine this accuracy threshold based on empirical data.

System 160 also determines a threshold for a statistical significance, which can be determined based on the p-value from the K-S test. System 160 then determines the true-positive data points, such as data point 302, from the comparison (left-bottom corner of portability analysis 300). For a true-positive data point, the p-value indicates statistical significance with accuracy below the accuracy threshold. System 160 further determines the false-positive data points, such as data point 304, from the comparison (right-bottom corner of portability analysis 300). For a false-positive data point, the p-value indicates non-significance with accuracy below the accuracy threshold. Based on the true-positive and false-positive data points, system 160 determines the recall, which is the percentage of model 102 able to detect data points with statistical significance among all data points below the accuracy threshold. If the recall is below a portability threshold, system 160 recommends portability for model 102.

Operations

Figure 4A:
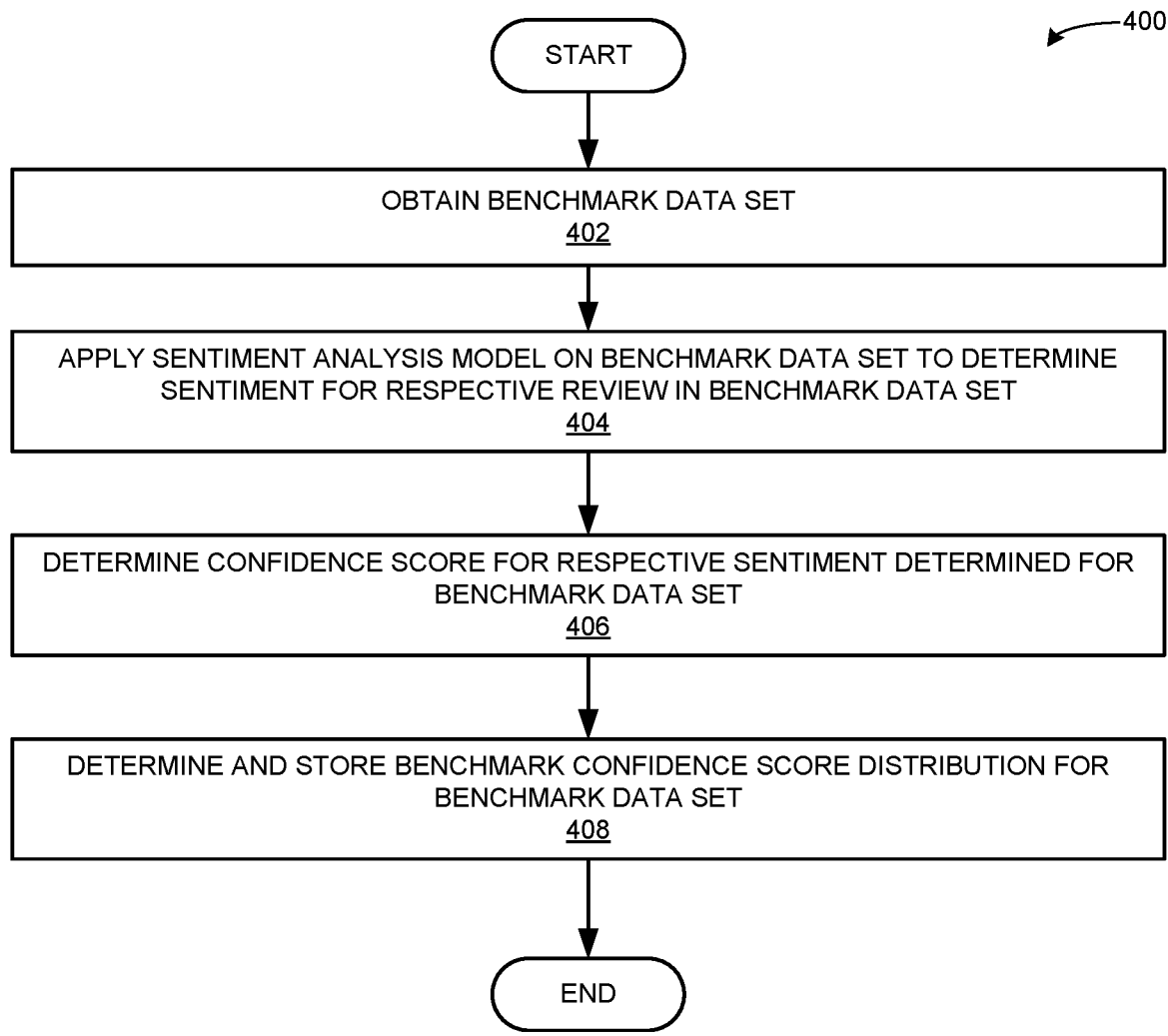
FIG. 4A presents a flowchart illustrating a method for determining a confidence score distribution of a benchmark data set using a sentiment analysis model, in accordance with an embodiment of the present invention.

FIG. 4A presents a flowchart illustrating a method 400 for determining a confidence score distribution of a benchmark data set using a sentiment analysis model, in accordance with an embodiment of the present invention. During operation, a portability analysis system obtains a benchmark data set (operation 402) and applies the sentiment analysis model on the benchmark data set to determine the sentiment for a respective review in the benchmark data set (operation 404). The system further determines the confidence score for a respective sentiment determined for the benchmark data set (operation 406). The system then determines and stores the benchmark confidence score distribution for the benchmark data set (operation 408).

Figure 4B:
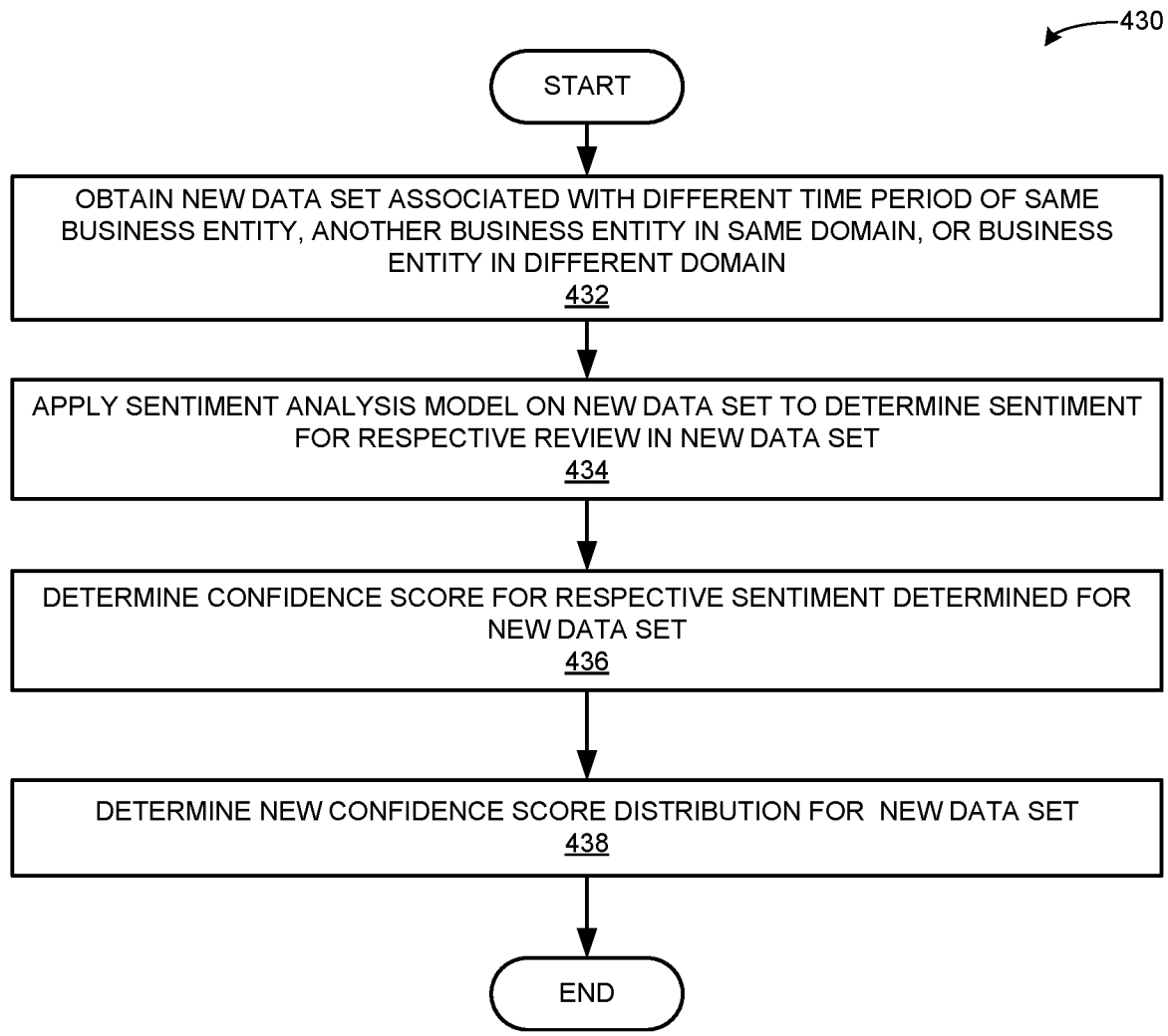
FIG. 4B presents a flowchart illustrating a method for determining a confidence score distribution of a new data set using a sentiment analysis model, in accordance with an embodiment of the present invention.

FIG. 4B presents a flowchart illustrating a method 430 for determining a confidence score distribution of a new data set using a sentiment analysis model, in accordance with an embodiment of the present invention. During operation, a portability analysis system obtains a new data set associated with a different time period of the same business entity, another business entity in the same domain (e.g., another business entity in the same industry), or a different domain (e.g., another business entity in another industry) (operation 432). The system applies the sentiment analysis model on the new data set to determine the sentiment for a respective review in the new data set (operation 434). The system further determines the confidence score for a respective sentiment determined for the new data set (operation 436). The system then determines the new confidence score distribution for the benchmark data set (operation 438).

Figure 4C:
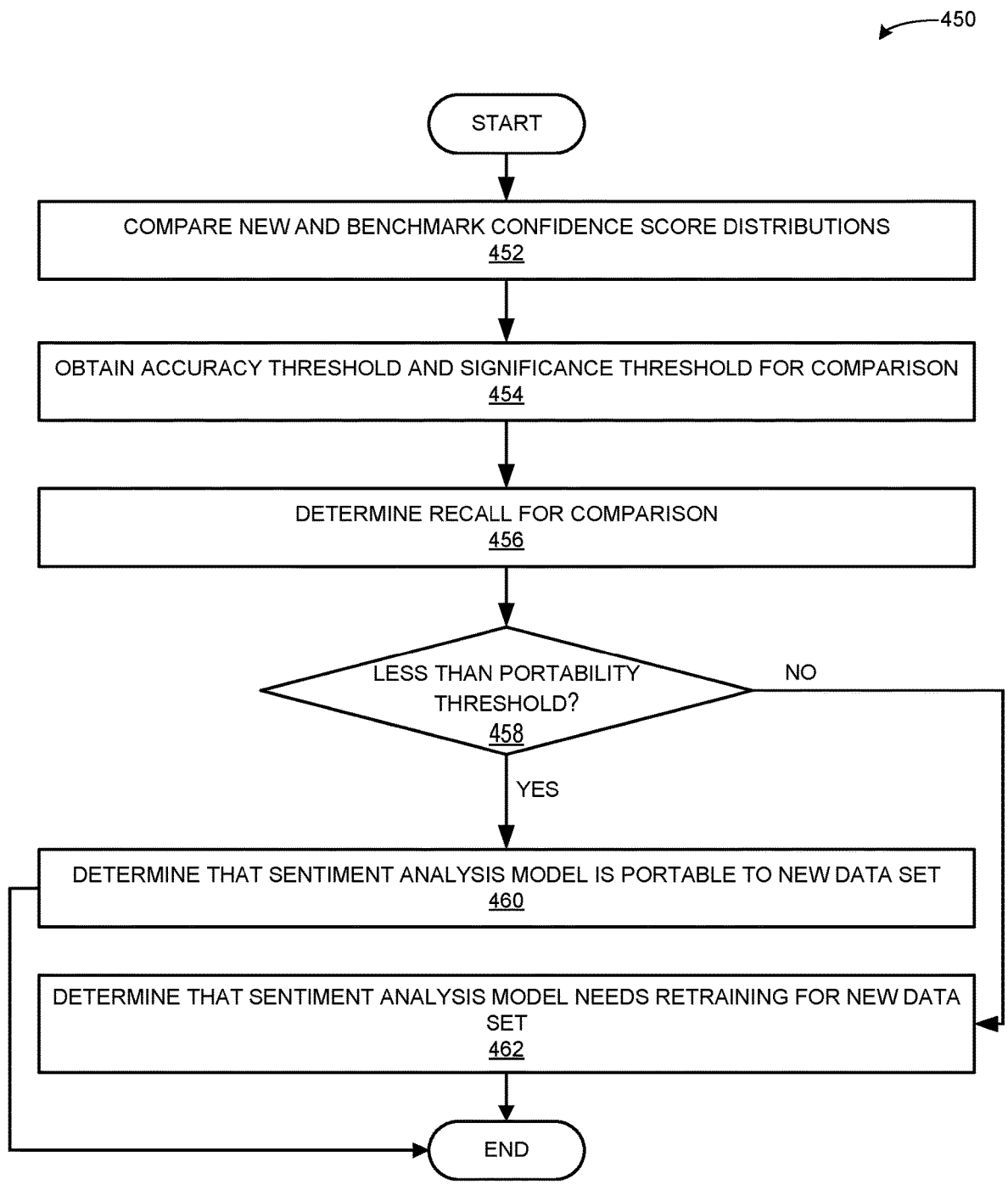
FIG. 4C presents a flowchart illustrating a method for determining whether a sentiment analysis model is portable from a benchmark data set to a new data set, in accordance with an embodiment of the present invention.

FIG. 4C presents a flowchart illustrating a method 450 for determining whether a sentiment analysis model is portable from a benchmark data set to a new data set, in accordance with an embodiment of the present invention. During operation, a portability analysis system compares the new and benchmark confidence score distributions (operation 452). The system then obtains the accuracy threshold and the significant threshold (operation 454) and determines the recall for the comparison (operation 456). The system checks whether the recall is less than the portability threshold (operation 458). If the recall is less than the portability threshold, the system determines that the sentiment analysis model is portable to the new data set (operation 460). Otherwise, the system determines that the sentiment analysis model needs retraining for the new data set (operation 462).

Figure 5:
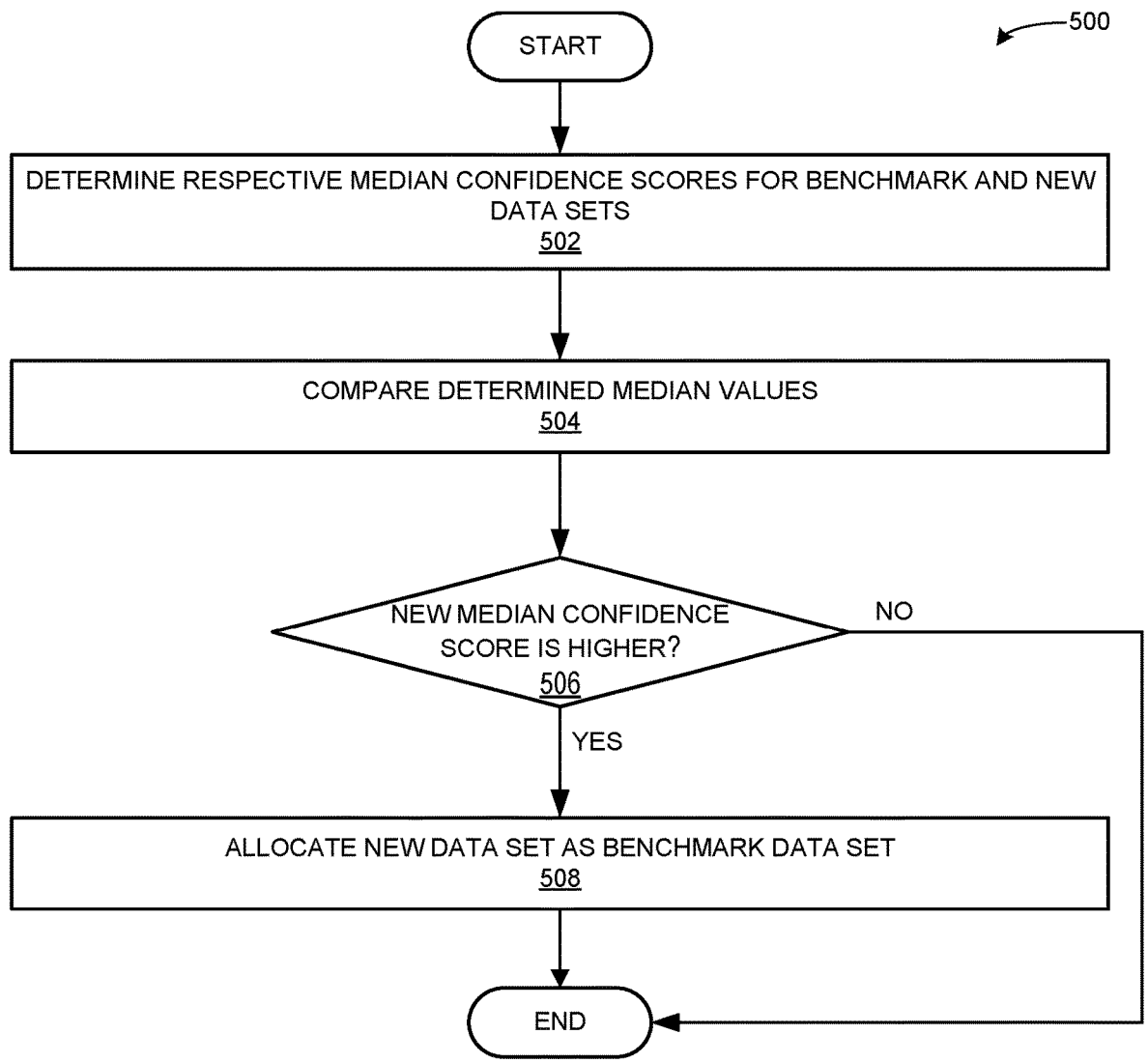
FIG. 5 presents a flowchart illustrating a method for determining a new benchmark data set for a sentiment analysis model, in accordance with an embodiment of the present invention.

FIG. 5 presents a flowchart illustrating a method 500 for determining a new benchmark data set for a sentiment analysis model, in accordance with an embodiment of the present invention. During operation, a portability analysis system determines the respective median confidence scores for the benchmark and the new data sets (operation 502). The system compares the determined median values (operation 504). The system checks whether the new median confidence score is higher than the median confidence score of the benchmark data set (operation 506). If the new median confidence score is higher, the system allocates the new data set as the benchmark data set (operation 508).

Exemplary Computer and Communication System

Figure 6:
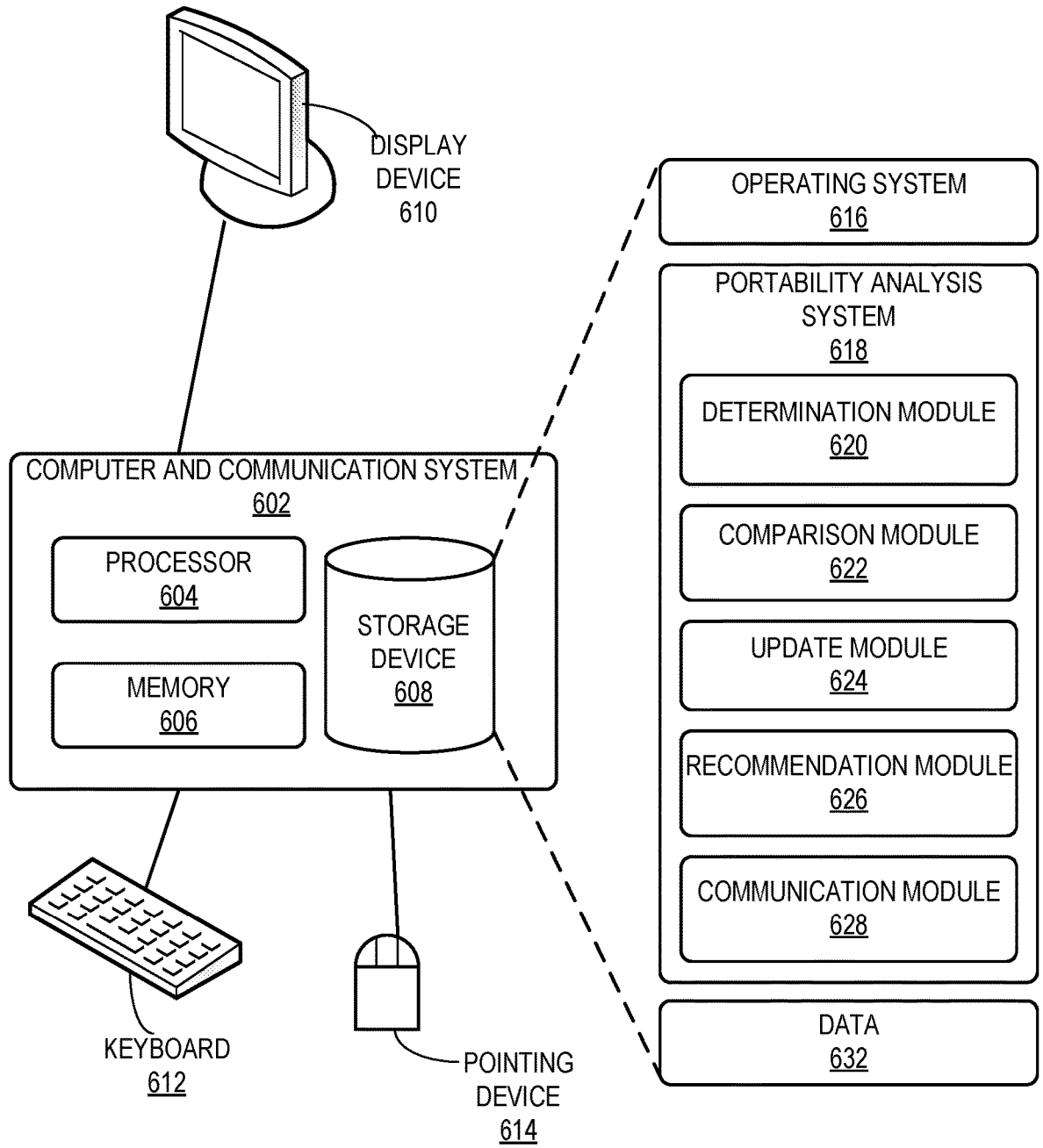
FIG. 6 illustrates an exemplary computer and communication system that facilitates a portability analysis system, in accordance with an embodiment of the present invention.

FIG. 6 illustrates an exemplary computer and communication system that facilitates a portability analysis system, in accordance with an embodiment of the present invention. A computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a portability analysis system 618, and data 632.

Portability analysis system 618 can include instructions, which when executed by computer and communication system 602, can cause computer and communication system 602 to perform the methods and/or processes described in this disclosure. Portability analysis system 618 includes instructions for determining the sentiment expressed in the text of a respective user review in a data set and a corresponding confidence score for the sentiment (determination module 620). Portability analysis system 618 can also include instructions for determining a confidence score distribution for the data set (determination module 620).

Portability analysis system 618 further includes instructions for comparing a new confidence score distribution with a benchmark confidence score distribution (e.g., for calculating recall from a K-S test) (comparison module 622). Portability analysis system 618 can also include instructions for updating a benchmark data set with a new data set based on respective median scores (update module 624). Portability analysis system 618 can include instructions for facilitating a commendation indicating whether a sentiment analysis model is portable to a new data set based on whether the recall is less than a portability threshold (recommendation module 626). Portability analysis system 618 can include instructions for displaying, via display device 610 using a graphical or textual interface, a recommendation to an administrator indicating the portability of the sentiment analysis model (recommendation module 626).

Portability analysis system 618 can also include instructions for exchanging information with other devices (communication module 628). Data 632 can include any data that is required as input or that is generated as output by the methods and/or processes described in this disclosure. Data 632 can include one or more of: a benchmark confidence score distribution, a new confidence score distribution, a benchmark data set, and a new data set.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating portability analysis for a sentiment analysis model, the method comprising:
   determining a first distribution of confidence scores for a first data set by applying a sentiment analysis model to a plurality of reviews in the first data set;
   comparing the first distribution of confidence scores to a benchmark distribution of confidence scores, wherein a benchmark data set associated with the benchmark distribution is different from the first data set;
   in response to the comparing, determining a recall based on an accuracy threshold and a significant threshold; and
   comparing the recall to a portability threshold and in response thereto determining whether the sentiment analysis model associated with the benchmark data set is portable to the first data set.

2. The computer-implemented method of claim 1 further comprising displaying, via a display device, a recommendation indicating whether the sentiment analysis model is portable to the first data set.

3. The computer-implemented method of claim 1, wherein the sentiment analysis model is portable to the first data set if the recall is less than the portability threshold.

4. The computer-implemented method of claim 1 further comprising retraining the sentiment analysis model if the sentiment analysis model is determined to be not portable to the first data set.

5. The computer-implemented method of claim 1, wherein the accuracy threshold is based on empirical data.

6. The computer-implemented method of claim 1, wherein the significance threshold is based on a p-value obtained from a K-S test.

7. The computer-implemented method of claim 1, wherein the recall is detecting data points with statistical significance among all data points below the accuracy threshold.

8. The computer-implemented method of claim 1, wherein the recall is further based on a true-positive data point and a false-negative data point.

9. The computer-implemented method of claim 1, wherein a review from the plurality of reviews comprises text.

10. The computer-implemented method of claim 1, further comprising:
    generating a tag for a review from the plurality of reviews to indicate whether the review expresses positive, negative, neutral, or mixed sentiment.

11. The computer-implemented method of claim 1, wherein the benchmark data set comprises a set of reviews over a first period of time for a business entity, and wherein the first data set is a set of reviews over a second period of time for the same business entity.

12. The computer-implemented method of claim 1, wherein the benchmark data set comprises a set of reviews over a first period of time for a business entity, and wherein the first data set is a set of reviews for a second business entity in a same industry as the business entity.

13. The computer-implemented method of claim 1, wherein the benchmark data set comprises a set of reviews over a first period of time for a business entity, and wherein the first data set is a set of reviews for a third business entity in a different industry than the business entity.

14. A computer system for non-parametric correlation analysis, the system comprising:
- a processor; and
- a storage device storing instructions that when executed by the processor causes the processor to perform a method, the method comprising:
  - determining a first distribution of confidence scores for a first data set by applying a sentiment analysis model to a plurality of reviews in the first data set;
  - comparing the first distribution of confidence scores to a benchmark distribution of confidence scores, wherein a benchmark data set associated with the benchmark distribution is different from the first data set;
  - in response to the comparing, determining a recall based on an accuracy threshold and a significant threshold; and
  - comparing the recall to a portability threshold and in response thereto determining whether the sentiment analysis model associated with the benchmark data set is portable to the first data set.

15. The computer-implemented method of claim 14 further comprising displaying, via a display device, a recommendation indicating whether the sentiment analysis model is portable to the first data set.

16. The computer-implemented method of claim 14, wherein the sentiment analysis model is portable to the first data set if the recall is less than the portability threshold.

17. The computer-implemented method of claim 14 further comprising retraining the sentiment analysis model if the sentiment analysis model is determined to be not portable to the first data set.

18. The computer-implemented method of claim 14, wherein the accuracy threshold is based on empirical data.

19. The computer-implemented method of claim 14, wherein the significance threshold is based on a p-value obtained from a K-S test.

20. The computer-implemented method of claim 14, wherein the recall is detecting data points with statistical significance among all data points below the accuracy threshold.

21. The computer-implemented method of claim 14, wherein the recall is further based on a true-positive data point and a false-negative data point.

22. The computer-implemented method of claim 14, wherein a review from the plurality of reviews comprises text.

23. The computer-implemented method of claim 14, further comprising:
- generating a tag for a review from the plurality of reviews to indicate whether the review expresses positive, negative, neutral, or mixed sentiment.

24. The computer-implemented method of claim 14, wherein the benchmark data set comprises a set of reviews over a first period of time for a business entity, and wherein the first data set is a set of reviews over a second period of time for the same business entity.

25. The computer-implemented method of claim 14, wherein the benchmark data set comprises a set of reviews over a first period of time for a business entity, and wherein the first data set is a set of reviews for a second business entity in a same industry as the business entity.

26. The computer-implemented method of claim 14, wherein the benchmark data set comprises a set of reviews over a first period of time for a business entity, and wherein the first data set is a set of reviews for a third business entity in a different industry than the business entity.

* * * * *